US011991221B1

(12) United States Patent
Marchand et al.

(10) Patent No.: US 11,991,221 B1
(45) Date of Patent: *May 21, 2024

(54) REVERSE DISCOVERY AND PAIRING OF CLIENT DEVICES TO A MEDIA DEVICE

(71) Applicant: Google LLC, Mountain View, CA (US)

(72) Inventors: Julien Marchand, Zurich (CH); Ramona Bobohalma, Mountain View, CA (US); Daniel Kaemmerer, San Bruno, CA (US); Sana Mithani, Plantation, FL (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,910

(22) Filed: Jun. 17, 2022

Related U.S. Application Data

(63) Continuation of application No. 17/306,932, filed on May 3, 2021, now Pat. No. 11,368,500, which is a
(Continued)

(51) Int. Cl.
*H04L 65/1073* (2022.01)
*H04L 61/4541* (2022.01)
(Continued)

(52) U.S. Cl.
CPC ...... *H04L 65/1073* (2013.01); *H04L 61/4541* (2022.05); *H04L 65/403* (2013.01); *H04L 67/51* (2022.05); *H04W 8/005* (2013.01)

(58) Field of Classification Search
CPC ............. H04L 65/1073; H04L 61/4541; H04L 65/403; H04L 67/51; H04W 8/005
See application file for complete search history.

(56) References Cited

U.S. PATENT DOCUMENTS 8,019,878 B1 9/2011 Allen et al.
8,549,658 B2 10/2013 Kolavennu et al.
(Continued)

FOREIGN PATENT DOCUMENTS

WO 2014151397 A1 9/2014

OTHER PUBLICATIONS

JCSSE, 2014 (Yoon et al.) FFD013 "A New Simple Wi-Fi Direct Connection Method using NFC on Remote Control and DTV" 14 pgs.
(Continued)

*Primary Examiner* — Nicholas R Taylor
*Assistant Examiner* — Tania M Pena-Santana
(74) *Attorney, Agent, or Firm* — Lowenstein Sandler LLP

(57) ABSTRACT

A registration request is transmitted to register a media device with a server, the registration request comprising a device identifier associated with the media device. A discovery request is caused to be issued to allow client devices previously registered with the server and connected to the first network to discover the media device, wherein the discovery request is to cause at least a subset of the client devices previously registered with the server and connected to the first network to initiate discovery of the media device without requesting permission from a user of a respective client device to initiate the discovery of the media device, wherein the at least the subset of the client devices includes two or more client devices each associated with an autoconnect status. An identifier of each of the one or more client devices that are previously registered with the server and connected to a first network and an indication of whether each of the one or more client devices has discovered the media device are received, wherein each of the plurality of client devices is associated with a registration identifier pertaining to the first network.

23 Claims, 8 Drawing Sheets

Related U.S. Application Data continuation of application No. 15/221,072, filed on Jul. 27, 2016, now Pat. No. 10,999,331.

(60) Provisional application No. 62/358,682, filed on Jul. 6, 2016.

(51) Int. Cl.
*H04L 65/403* (2022.01)
*H04L 67/51* (2022.01)
*H04W 8/00* (2009.01)

(56) References Cited

U.S. PATENT DOCUMENTS

| | | | | |
|---|---|---|---|---|
| 2008/0120408 A1* | 5/2008 | Kim | .................. | H04L 12/282 |
| | | | | 709/224 |
| 2008/0242222 A1* | 10/2008 | Bryce | .................. | H04S 7/30 |
| | | | | 455/3.06 |
| 2010/0131978 A1* | 5/2010 | Friedlander | ......... | H04L 12/2812 |
| | | | | 725/37 |
| 2010/0169399 A1 | 7/2010 | Moroney et al. | | |
| 2011/0295974 A1* | 12/2011 | Kashef | ............... | H04L 65/1094 |
| | | | | 709/217 |
| 2012/0087634 A1* | 4/2012 | Lalwaney | ........... | H04L 65/1093 |
| | | | | 386/E5.003 |
| 2012/0250576 A1* | 10/2012 | Rajamani | ............. | H04W 8/005 |
| | | | | 370/254 |
| 2012/0296986 A1 | 11/2012 | Hassan et al. | | |
| 2013/0024685 A1 | 1/2013 | Kolavennu et al. | | |
| 2013/0086232 A1* | 4/2013 | Hwang | .................. | H04W 4/00 |
| | | | | 709/221 |
| 2013/0090169 A1 | 4/2013 | Liu et al. | | |
| 2013/0203448 A1 | 8/2013 | Kang et al. | | |
| 2014/0115060 A1 | 4/2014 | Kim et al. | | |
| 2014/0310599 A1* | 10/2014 | Clift | ....................... | G06F 3/0484 |
| | | | | 715/719 |
| 2015/0082241 A1 | 3/2015 | Kang et al. | | |
| 2015/0089222 A1 | 3/2015 | White et al. | | |
| 2015/0312648 A1 | 10/2015 | Zhang et al. | | |
| 2015/0319046 A1 | 11/2015 | Plummer et al. | | |
| 2015/0334334 A1 | 11/2015 | White et al. | | |
| 2015/0349934 A1 | 12/2015 | Pollack et al. | | |
| 2015/0365457 A1* | 12/2015 | Dvir | ................... | H04L 61/4541 |
| | | | | 709/219 |
| 2016/0248746 A1 | 8/2016 | James et al. | | |
| 2018/0316615 A1* | 11/2018 | Shaw | ................. | H04L 41/0806 |

OTHER PUBLICATIONS

Rasmus Larsen "MiniTV LG Magic app for smartphone & tablets—ref 1," Jul. 16, 2012 4 pgs, accessed Jul. 8, 2016 at http://flatpanelshd.com/news.php?subaction=showfull&id=342443792.

"MiniTV LG Magic app for smartphone & tablets—ref 2," 4 pgs, accessed Jul. 8, 2016 at https://play.google.com/store/apps/details?id=com.lge.tv.remoteapps&hl=en.

* cited by examiner

REVERSE DISCOVERY AND PAIRING OF CLIENT DEVICES TO A MEDIA DEVICE

RELATED APPLICATIONS

This application is a continuation application of co-pending U.S. patent application Ser. No. 17/306,932, filed May 3, 2021, which is a continuation application of U.S. patent application Ser. No. 15/221,072, entitled, "Reverse Discovery And Pairing Of Client Devices To A Media Device," filed Jul. 27, 2016, which claims priority to U.S. Provisional Patent Application No. 62/358,682, entitled "Reverse Discovery And Pairing Of Client Devices To A Media Device," filed Jul. 6, 2016, each of which is incorporated herein by reference.

BACKGROUND

Smart TV technology allows a user to stream content from the internet to a large screen device such as a TV, game console, over-the-top device, or set-top box. Smart TV devices provide advertisers with opportunities to deliver advertising, shopping cart models, or other interactive content to users via the streaming content. However, the functional limitations of a Smart TV prevent the user from fully experiencing these interactive content features. For example, an advertiser may want to deliver clickable content that redirects the user to a website. However, many Smart TVs either have simple browsers that are missing interactive content plugins (e.g., Flash, Java, Silverlight, or other NPAPI plugins) or lack a browser altogether. Smart TVs also store a minimal amount of user data making personalization of content more difficult.

Screen casting allows a smaller-screen device, such as a notebook, laptop, desktop, tablet, or smartphone, to wirelessly project or "cast" its screen onto a larger-screen device, such as a Smart TV, game console, set-top box, or other media device, or control playback on the larger-screen device of other media. A user may manually initiate a discovery procedure on the smaller-screen device, so that it may discover the larger-screen device, initiate a connection between the two devices, and begin the casting session.

SUMMARY

In some implementations, a media device, such as a Smart TV, game console, set top box, or other media device may be connected to another device of a user, such as a smart phone, tablet computer, or wearable computer, to allow content interaction. In some instances, the devices may establish connections via a discovery procedure, such as a Discovery and Launch (DIAL) protocol. Such protocols allow for a second-screen device, such as the user device, to discover a first-screen device, such as a Smart TV or other media device. However, these user-device-to-media-device protocols typically require user direction and interaction to initiate discovery and establish connections, which may be complex or frustrating. Conversely, media devices generally are unable to initiate other discovery protocols, such as the Simple Service Discovery Protocol (SSDP), because they are unable to open connection sockets. Other co-presence channels (e.g., Wi-Fi, Bluetooth, and GPS) do not provide a solution either because they are generally not accessible through a media device's simple browser. As a result, users have to initiate discovery and establish connections ahead of time for each device that they want the media device to communicate with. This becomes especially inconvenient when there are multiple devices seeking to connect to the media device because the discovery/connection has to be initiated from each user device.

Accordingly, the present disclosure describes methods and systems for an automatic device discovery and connection protocol via a multi-device experience server. The server may register user devices and associate them with a local network. Upon receiving a request from a media device on the local network, the server may trigger a user device to automatically discover and connect to the media device, increasing speed of discovery and connections, reducing required user control and direction, and enhancing connectivity and communications between the devices, providing new channels for interaction.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

In some implementations, a media device, such as a Smart TV, game console, set top box, or other media device may be connected to another device of a user, such as a smart phone, tablet computer, or wearable computer, to allow content interaction. In some instances, the devices may establish connections via a discovery procedure, such as a Discovery and Launch (DIAL) protocol. Such protocols allow for a second-screen device, such as the user device, to discover a first-screen device, such as a Smart TV or other media device. However, these user-device-to-media-device protocols typically require user direction and interaction to initiate discovery and establish connections, which may be complex or frustrating. Conversely, media devices generally are unable to initiate other discovery protocols, such as the Simple Service Discovery Protocol (SSDP), because they are unable to open connection sockets. Other co-presence channels (e.g., Wi-Fi, Bluetooth, and GPS) do not provide a solution either because they are generally not accessible through a media device's simple browser. As a result, users have to initiate discovery and establish connections ahead of time for each device that they want the media device to communicate with. This becomes especially inconvenient when there are multiple devices seeking to connect to the media device because the discovery/connection has to be initiated from each user device.

Figure 1A:
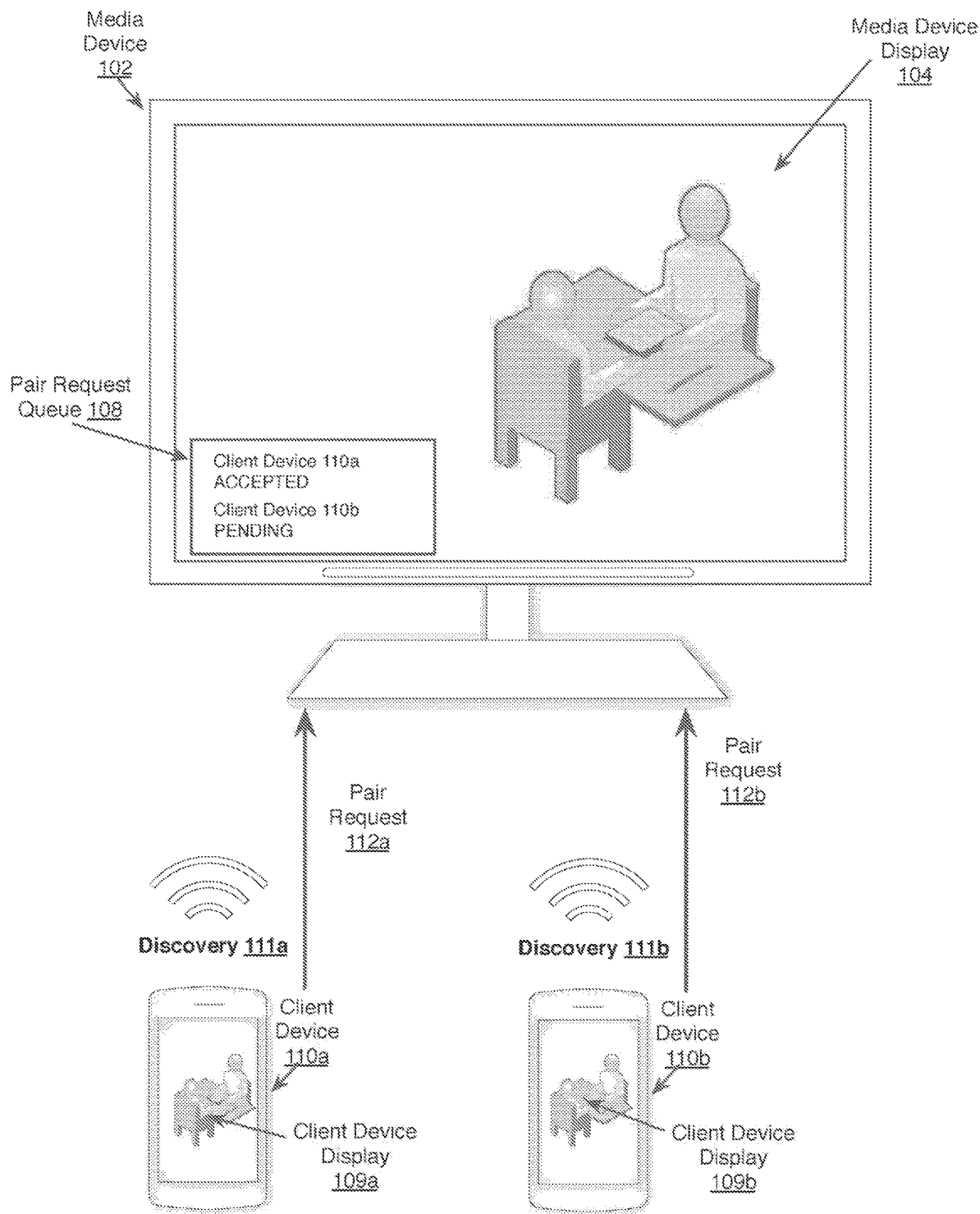
FIG. 1A is a diagram of a plurality of client devices initiating the discovery and subsequent pairing to a media device.

For example, and referring briefly to FIG. 1A, illustrated is a system with a user device-initiated discovery protocol, such as the Discovery and Launch (DIAL) protocol. User devices, sometimes referred to as clients or client devices or second-screen devices, such as a mobile device, tablet device, laptop device, wearable device, or other type of user device, may use the protocol to discover a media device, sometimes referred to as a host or host device or first-screen device, such as a Smart TV, set-top-box, or other device. Once connected or "paired", media content may be provided to one device by another, such as screencasting from a user device to the media device, or providing interactive content from the media device to the user device. Screencasting may provide different types of data, such as mirroring a screen of the user or client device on the media device or vice versa, sometimes called screen mirroring. In other implementations, screencasting may provide different content to the media device or user device, sometimes called video casting or content casting. For example, in one such implementation, a user may select videos from a playlist displayed on a portable device, the videos then cast to or displayed on the media device, or vice versa. In some implementations, the data may be provided from the client device to the media device or vice versa, while in other implementations, the client device may direct the media device to retrieve data from a third party (e.g. a content server) or vice versa. In another such implementation, the media device may "cast" an interactive form to the client device related to content displayed on the media device (such as a form to allow the user to obtain more information about a television show being displayed on the media device). Connections may be via any wireless communication interface, such as 802.11 ("WiFi"), Bluetooth, Wireless Universal Serial Bus (wireless USB), or any other such interface.

Once the second-screen device establishes communication to the first-screen device, the second-screen device may project its screen onto the first-screen device as shown. In some implementations, the wireless connection may also allow for the sharing of media content such as videos, pictures, audio recordings, text, and advertisements from the second-screen device to the first-screen device. The shared media content may be stored and transmitted in any video format (e.g., 3g2, 3gp, avi, fly, mov, MPEG-1, MPEG-2, MPEG-4, mpg), any audio format (e.g., MP3), any archive format (e.g., ZIP), or any other media container formats.

In greater detail, FIG. 1A illustrates three second-screen devices or client devices 110a and 110b, referred to generally as a client device or second-screen device 110, and one first-screen device or media device 102, which are each within wireless range from one another. Client devices 110 may establish a wireless connection with a first-screen device, such as media device 102, by first discovering any nearby first-screen devices by executing a discovery protocol such as a Simple Service Discovery Protocol (SSDP) session, shown as discovery 111a from client device 110a, and discovery 111B from client device 110b. These sessions, which may include one or more broadcast, multicast, or unicast wireless transmissions over a local network, SSID monitoring, or other such actions, may generally be referred to as discovery 111. Via discovery 111, each client device 110 may determine that a media device 102 is within wireless range.

After a client device 110 discovers the media device 102, client device 110 may transmit a pair request signal 112 to media device 102 (e.g. pair request 112a from client device 110a, and pair request 112b from client device 110b). Each pair request 112 that is received by media device 102 may comprise a request of media device 102 to accept a wireless connection from the client device 102 that sent the pair request 112 (and may include further actions such as opening a port or socket on the media device, exchanging encryption keys or device identifiers, performing a synchronization protocol, etc.).

Still referring to FIG. 1A, media device 102 is shown as an internet-connected smart TV with a display screen, referred to as media device display 104, that is larger than display screens 109 of each client device 110 (e.g. client device display 109a for client device 110a, and client device display 109b for client device 110b). In some implementations, the display screen size of one or more client devices 110 may be larger than the display screen size of media device 102, such as a monitor connected to a desktop or laptop computer. While FIG. 1A illustrates a plurality of client devices 110 and a single media device 102, in some implementations, a single client device 110 may be in wireless communication with one or more media devices 102. In other implementations, a plurality of client devices 110 may be in wireless communication with a plurality of media devices 102. Although shown duplicating the display between client device display(s) 109 and media device display 104, in many implementations, different or related content may be displayed on client device displays 109 or media device display 104. For example, in one implementation, a first item of content, such as a television program or music video, may be displayed by the media device while a second, related item of content, such as a cast page or an album purchase page, may be displayed by the client device.

Media device 102 may maintain a wireless connection with multiple client devices 110, but in typical discovery protocols, each connection must be separately initiated from each client device 110. For example, client device 110a may discover media device 102 as a nearby first-screen device and subsequently transmit pair request 112a to media device 102. Media device 102 receives pair request 112a and stores pair request 112a in a pair request queue 108 pending instructions from the user of media device 102 to either accept or deny the request to form a wireless connection. Although illustrated as visible to a viewer, in many implementations, pair request queue 108 may comprise an internal data structure, array, or other data format. The media device 102 may display a notification or request indicating an attempted connection from a client device 110, and allow a viewer or user to select to authorize or refuse the connection attempt. Upon acceptance by the user, the media device may establish the wireless communication session between the client device 110 and media device 102, including performing any further handshaking, synchronization, or pairing actions; denial by the user will cause the media device to deny or prevent such a connection.

As discussed above, the user must perform actions on both the client devices, to initiate discovery, and the media device(s), to authorize or confirm pairing, before a session may be established. For example, having established connectivity with client device 110a, a user of client device 110b must again initiate discovery 111b to discover media device 102 and then transmit pair request 112b. The pair request is also placed into the pair request queue 108, which are currently shown as 'pending' in FIG. 1A Therefore, without support for reverse discovery, a user of a second-screen device seeking to wirelessly connect to a first-screen device, must be inconvenienced by having to repeat the steps for connection on each second-screen device.

In addition, media devices such as Smart TVs generally are unable to initiate Simple Service Discovery Protocol (SSDP) discovery because they are unable to open connection sockets. Other co-presence channels (e.g., Wi-Fi, Bluetooth, and GPS) do not provide a solution either because they are generally not accessible through the Smart TV's simple browser. As a result, users have to initiate the discovery/connection ahead of time for each client or second-screen device that they want the media device to interact with. This prevents enhanced features to be presented from the media device to the client device (such as purchase pages or additional information) without first requiring user action.

Accordingly, the present disclosure is directed to methods and systems for a multi-device experience server. The server may act as an intermediary, allowing the media device to initiate discovery and the client devices receive notifications, without requiring additional user intervention, to automatically establish communications sessions between devices.

In one implementation, the systems described herein use an intermediary server, referred to as a multi-device experience (MDX) server to trigger each second-screen or user device to initiate the discovery of first-screen device(s) and establish connections from the second-screen device to one or more first-screen devices, such as a Smart TV. Each second-screen device registers themselves with the MDX server, either via a direct communication or, in some implementations, via a cloud messaging service, and receives a registration identifier.

A service executed by each second-screen device monitors a network interface for network changes and, in response to connecting to a new local area network (LAN), sends the MDX server a connection notification comprising the device's registration identifier and the public or external internet protocol (IP) address of the LAN. The MDX server generates a notification key associated with the external IP address, if one does not already exist in a key database, and adds or concatenates the client device's registration identifier to the key. Accordingly, the notification key will contain registration identifiers of each second-screen device on that particular network. A first-screen device may initiate discovery on its local network by transmitting a request to the MDX server, which may transmit corresponding discovery triggers to the second-screen devices identified in a key associated with that network. In some implementations, notification keys may be periodically flushed or deleted by the MDX server, or registration identifiers may be flushed or removed from a key on expiration of a timer. In some implementations, the MDX server may periodically query a device to determine whether it is still attached to the local network, and if not, may flush or release the identifier from the corresponding key. In a similar implementation, each device may periodically transmit an identifier to the MDX server to identify whether it is still attached to the local network. Such identifiers may include the local network's external or public IP address, a flag indicating 'no network change', or other identifiers. Responsive to receiving an identifier with a new IP address, or not receiving an identifier at an expected time (e.g. expiration of a timer), the MDX server may flush or remove the device's registration identifier from the notification key.

Figure 1B:
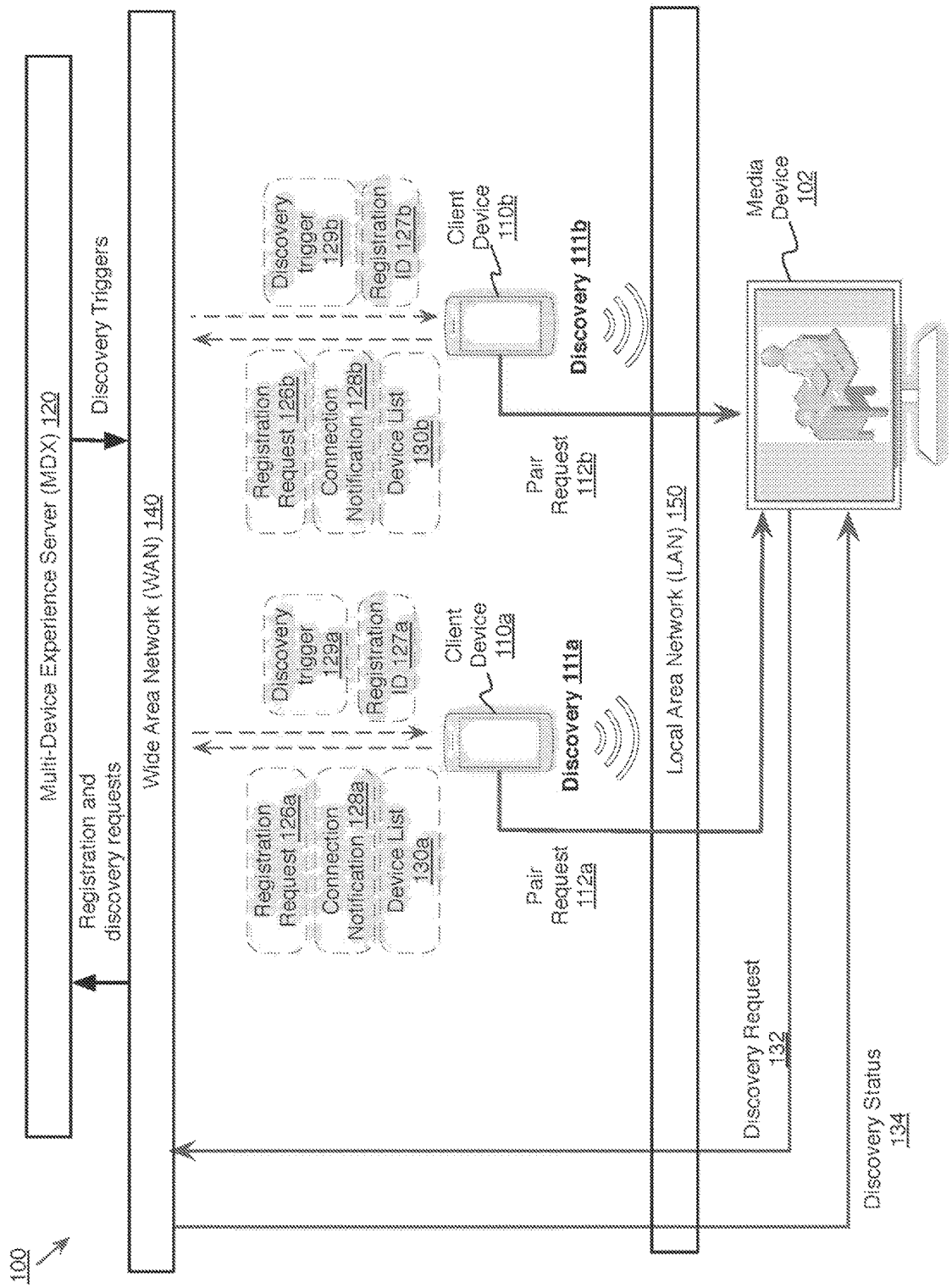
FIG. 1B is a diagram of an example environment for delivering discovery triggers from a multi-device experience (MDX) server to a client device in response to a request by a media device.

Referring now to FIG. 1B, illustrated is an example implementation of a server-based second-screen discovery and connection system 100. A second-screen device, such as a smartphone or desktop computing device (e.g., client devices 110a, 110b), may be triggered to initiate a discovery and wireless connection procedure from the second-screen device to a first-screen device, such as a Smart TV (e.g., media device 102), by the MDX server 120. By using the server as an intermediary to trigger discovery on second-screen devices, the system is able to overcome the functional limitations of a Smart TV; such as the Smart TV's inability to "reverse discover" second-screen devices, and the user inconvenience of having to manually initiate a discovery and pairing procedure on each phone seeking to connect the Smart TV. In some implementations, the illustrated system performs operations in three phases: a Registration phase, a Connection phase, and a Discovery phase.

The example environment 100 may include a first-screen or host device (e.g., media device 102), second-screen devices (e.g., client device 110), and an MDX server (e.g., multi-device experience server 120) in communication through a local area network (e.g., LAN 150), a wide area network (e.g., WAN 140) such as the Internet, or a combination of these or other networks. Although communications are illustrated as traveling between the MDX server 120 and other devices via WAN 140, in many implementations, communications to these devices may travel via WAN 140 to a gateway, switch, or access point (not illustrated) that provides network address translation and routing to devices on the LAN 150. Accordingly, in the example illustration of FIG. 1B, communications that are exclusively between devices connected to LAN 150 are illustrated as traversing LAN 150, while communications traveling at least partly via WAN 140 (and potentially partly via LAN 150) are illustrated as traversing WAN 140. Although only a single LAN 150 is illustrated, in many implementations, an MDX server 120 may communicate via WAN 140 with many household or local networks 150, and correspondingly many media devices 102 and/or client devices 110. In many implementations, WAN 140 and LAN 150 may comprise one or more intermediary devices, including gateways, routers, firewalls, switches, network accelerators, Wi-Fi access points or hotspots, or other devices not illustrated. The devices may communicate with the MDX server via any type and form of protocol, such as via hypertext transfer protocol (HTTP), a representational state transfer (RESTful) protocol, extensible markup language (XML), short messaging service (SMS) via a telephone network, a cloud messaging (CM) protocol via a CM service or server (not illustrated), or any other such communication system. In some implementations, the MDX server may comprise or communicate with other servers, such as a web server, CM server, file transfer server, or other server for performing registration, queuing of messages, and delivery of data to applications running on second-screen devices.

During a Registration phase, a second-screen device 110 may register itself with the MDX server 120 by transmitting a registration request 126 (e.g. registration requests 126a, 126b) to the server. The registration request 126 may be transmitted via a LAN 150 and WAN 140 via TCP/IP, such as via HTTP, JSON, or another protocol; may be transmitted via a telephone network, such as an SMS message via a cellular network; or may be transmitted via any other type and form of communication system. In some implementations, a registration request 126 may be transmitted to MDX server 120 via a cloud messaging service. In some implementations, the registration request 126 may comprise a device identifier of the client device 110, such as a media access control (MAC) address, a subscriber identity module (SIM) address, an account name, a user name, or any other type and form of device identifier. In some implementations, the registration request 126 may comprise an address of the device for a cloud messaging service.

Responsive to receipt of the registration request 126, the MDX server 120 may generate a unique registration identifier for the device. In some implementations, the registration identifier may be the same as the device identifier or include the device identifier (e.g. the device identifier concatenated with a timestamp, or other such information). In other implementations, the registration identifier may not include the device identifier or may be separately generated (e.g. via a random number generator or other data source). This may provide anonymity for the device. In some implementations, the registration identifier may be transmitted to the client device 110, as shown at step 127 (e.g. registration identifiers 127*a*, 127*b*).

During the connection phase and after registering, a second-screen device may monitor its network connection for changes. For example, in some implementations, a monitor executed by the device may periodically request an external IP address of the device (e.g. via an external service over the Internet). In other implementations, a monitor of the device may hook an application programming interface (API) of the operating system of the device that communicates with a network interface of the device, such as a WiFi interface, for connection establishment or IP address obtained messages.

Upon detecting a connection to a new network, the device may transmit a connection notification message 128 (e.g. messages 128*a*, 128*b*) to the MDX server, comprising its registration identifier 127, via the network. In some implementations, the device may explicitly include the network's public or external IP address in the connection notification message 128. In other implementations, the device may transmit the message 128 via a gateway of the local area network performing network address translation. The gateway may accordingly replace a source IP of the message 128 with the external IP address of the gateway. The MDX server may extract the IP address from the IP layer header of the message packet to identify the network to which the device has connected. The connection notification message 128 may include the registration identifier 127 anywhere within the packet, such as an options field of an Internet or Transport layer header, in an application layer payload, or any other predetermined position.

Upon receipt of the connection notification message 128, the MDX server may extract the device registration ID and public or external IP address, and may add the device registration identifier to a notification key associated with the IP address (generating the key if necessary). The notification key associated with a network's external IP address thus will include each registration identifier of devices connected to said network.

During the Discovery Phase, the media device 102 may transmit a discovery request 132 to the MDX server 120. As shown, in many implementations, the discovery request 132 may be transmitted via the LAN to a gateway device (not illustrated) which may perform network address translation and transmit the discovery request via the WAN 140. Accordingly, in many implementations, the discovery request 132 received by the MDX server may include the external IP address of the LAN as a source IP address. In other implementations, the media device 102 may explicitly add the IP address to the discovery request 132. The discovery request may also include a device identifier of the media device 102, such as a MAC address, device name, device type, or other such identifier.

Upon receipt of the discovery request 132, in some implementations, the MDX server may retrieve the notification key associated with the LAN external IP address. As discussed above, the notification key may include the registration identifiers of each second-screen device. The registration identifiers may be extracted from the notification key, and the MDX server may transmit a discovery trigger 129 to each device 110 (e.g. discovery triggers 129*a*, 129*b*). In some implementations, the discovery triggers 129 may be transmitted via a cloud messaging service or similar interface. The discovery trigger message 129 may comprise an API or remote procedure call (RPC) to trigger the device to begin performing a discovery protocol 111, such as broadcasting an availability message comprising its own device identifier or address via the LAN 150 or broadcasting an availability request from other devices via LAN 150. The media device 102, responsive to receiving such a request, may transmit its device identifier via the LAN.

Once one or more media devices 102 are discovered via discovery protocol 111, the second-screen or client device 110 may transmit a device list 130 (e.g. lists 130*a*, 130*b*) to the MDX server 120. The device list 130 may comprise device identifiers of each media device 102 discovered over the local network. The device list 130 may also identify the client device (e.g. including the registration identifier of the device, and/or a device identifier of the device). The MDX server 120 may transmit a discovery status message 134 to the media device 102, identifying each client device that has discovered the media device 102. The media device 102 may then establish a connection with the client devices via any suitable protocol, such as via pairing requests 112. In some implementations, establishing the connection may comprise displaying a message or prompt on the screen of the media device or client device for a user confirmation, while in other implementations, the user may have pre-authorized their device to accept connections established via this method.

This system may be used with multiple media devices 102 connected to a local area network, allowing disambiguation and automatic connection to one media device of the multiple media devices. For example, given four users in a household (e.g. Annie, Bob, Charlie, and Devin) each with their own client device 110, and different televisions within the household (e.g. living room television 102*a* and bedroom television 102*b*), each client device 110 may have been pre-registered for a unique registration identifier 127 with the MDX server 120 and/or a cloud messaging service for push notifications or messaging from the CM server. One day, Annie and Bob may both independently sit down to watch videos on their client devices 110 while at home connected to their WiFi LAN network 150. Charlie happens to also be in the house but isn't actively using the video service at the time. In the background, all of their client devices have registered their presence with the MDX server 120 via connection notifications 128.

Finding a funny video, Annie suggests to Bob that they watch together on the living room television 102*a*, so she turns on the television screen. After the television turns on, in some implementations, it may display an offer to connect to nearby devices. Annie may click yes with the television remote control, causing the television to transmit a discovery request 132 to the MDX server 120. In other implementations, the television may transmit the discovery request 132 automatically on starting up. Finding three nearby devices (Annie, Bob, and Charlie's client devices), the MDX server 120 may transmit discovery triggers to their registration identifiers found in the corresponding notification key for the LAN's external IP address, such as via push notifications over the cloud messaging service.

Annie may receive the push notification on her client device and presses accept to connect. Bob may have preconfigured his settings previously to auto-connect whenever requested via reverse-pairing, so his client device connects automatically and silently without bothering him with a push notification. Charlie may also receive the push notification, but may ignore the message or choose not to accept, so his client device does not initiate discovery procedures. Annie and Bob may then interact with the media devices via their client devices, such as screencasting, content casting, selecting content, or otherwise interacting with media content.

Devin comes home as Annie and Bob are watching television and her client device 110 transmits a connection notification 128 to the MDX server 120 as she walks in the door and connects to the WiFi LAN. The MDX server 120 may relay back to the living room television 102a that a new device is now available to connect via a discovery status message 134 and a popup may be presented on the television screen to give the viewers the option to connect to the newly available device. Annie and Bob ask Devin if she wants to watch with them, to which she says yes, so Annie uses the television remote to authorize the connection via the popup. The media device 102 may transmit another discovery request 132, causing the MDX server to transmit a discovery trigger 129 to Devin's device, initiating client device discovery and connection (in some implementations, Annie and Bob's client devices may also receive discovery triggers, and may ignore them, being already connected to the media device).

Charlie may subsequently join the others. Although he previously dismissed the push notification, he may still direct his client device to connect manually through traditional direct pairing methods.

Figure 2:
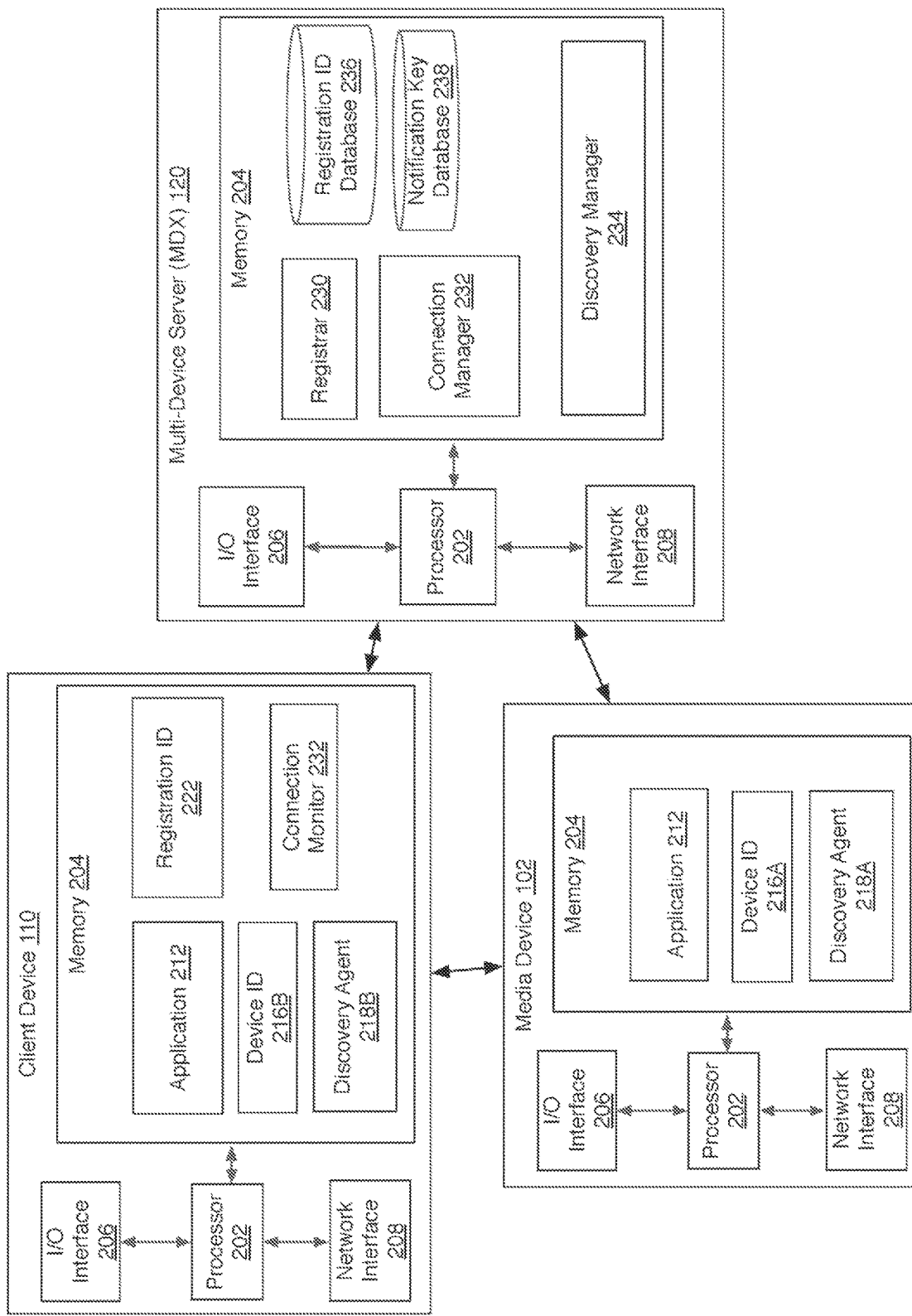
FIG. 2 is a block diagram of a system including a client device, a media device, and an MDX server, according to one implementation.

FIG. 2 is a block diagram of a system including a client device 110, a media device 102, and an MDX server 120, according to one implementation. Referring first to media device 102, a media device 102 may comprise any type and form of media providing device including a smart television, set top box, cable modem, video console, intelligent receiver, or other media device. Media device 102 may receive content from a broadcast provider, such as via terrestrial, satellite, or Internet broadcasting, including video on demand content or other content.

A media device 102 may include a processor 202 and memory 204. Memory 204 may store machine instructions that, when executed by processor 202 cause processor 202 to perform one or more of the operations described herein. Processor 202 may include a microprocessor, ASIC, FPGA, etc., or combinations thereof. In many implementations, processor 202 may be a multi-core processor or an array of processors. Memory 204 may include, but is not limited to, electronic, optical, magnetic, or any other storage devices capable of providing processor 202 with program instructions. Memory 204 may include a floppy disk, CD-ROM, DVD, magnetic disk, memory chip, ROM, RAM, EEPROM, EPROM, flash memory, optical media, or any other suitable memory from which processor 202 can read instructions. The instructions may include code from any suitable computer programming language such as, but not limited to, C, C++, C#, Java, JavaScript, Perl, HTML, XML, Python and Visual Basic.

A media device 102 may include one or more network interfaces 206. A network interface 206 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network or other computing devices. In many implementations, media device 102 may include a plurality of network interfaces 206 of different types, allowing for connections to a variety of networks, such as local area networks or wide area networks including the Internet, via different sub-networks. For example, media device 102 may include a coaxial interface to a broadband provider, cable modem, or satellite demodulator; as well as an 802.11 WiFi interface to a LAN.

Media device 102 may include one or more user interface or input/output devices 208. A user interface device 208 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of media device 102, such as a built-in display, touch screen, microphone, etc., or external to the housing of media device 102, such as a monitor connected to media device 102, a speaker connected to client device 102, etc., according to various implementations. Input/output devices 208 may also external devices in communication with the media device 102, such as remote controls communicating via an optical, infrared, wireless USB, or other interface.

Media device 102 may store within memory 204 and/or execute one or more applications 212, such as web browsers, media decoders or players, or other such applications. In some implementations, application 212 may provide screencasting or content casting features, such as receiving content from or selected by another device, such as client device(s) 110.

In some implementations, media device 102 may store a device identifier 216A within memory 204. Device identifier 216A may comprise a unique or semi-unique identifier that may be used to uniquely identify the media device 102 within a local network. For example, device identifier 216A may comprise a device type, brand, model number, manufacturer name, or an assigned name, such as "living room television". Device identifier 216A need not be unique globally, but may rather be unique among devices connected to a local area network. Device identifiers 216A may include any type and form of identification, including without limitation a MAC address, text and/or numerical data string, a username, a cryptographic public key, cookies, device serial numbers, user profile data, network addresses, or any other such identifier that may be used to distinguish the media device from other media devices on the network. The device identifier 216A may be broadcast on a local area network in response to a discovery request of a client device 110 and/or may be provided to an MDX server 120 with a discovery trigger request.

Media device 102 may execute a discovery agent 218A. Discovery agent 218A may comprise an application, service, server, daemon, routine, or other executable logic for initiating discovery trigger requests (e.g. automatically during power up or booting, or in response to a user command), responding to discovery requests from client devices (e.g. with a broadcast device identifier 216A), and for responding to pairing requests from client devices and establishing connections. Discovery agent 218A may execute one or more discovery and pairing protocols, as discussed above, including a discovery and launch (DIAL) protocol or a reverse-DIAL or MDX server-based discovery protocol.

Client device 110 may comprise an electronic device that is under control of or associated with a user and is capable of requesting and receiving resources and items of content over a network. Example client devices 110 include personal computers, mobile communication devices (e.g., smartphones or tablets), wearable computing devices, and other devices that can send and receive data over a network. A client device 110 typically includes one or more user applications 212, e.g., a web browser or a media player application, to facilitate the sending and receiving of data over a network. A client device 110 may comprise one or more processors 202, memory devices 204, I/O interfaces 206, and network interfaces 208. In many implementations, a client device 110 may communicate with other devices via different network interfaces, such as a cellular interface to a cloud messaging service and a WiFi interface to a media device 102 on a LAN, while in other implementations, a single interface (e.g. WiFi) may be used for both communications.

Client device 110 may include in memory 204 an application 212 or may execute an application 212 with processor 202. Application 212 may be an application, applet, script, service, daemon, routine, or other executable logic for receiving content and for transmitting responses, commands, or other data. In one implementation, application 212 may be a web browser, while in another implementation, application 212 may be a media presentation application. Application 212 may include functionality for displaying content received via network interface 208 and/or generated locally by processor 202, and for transmitting interactions received via a user interface device 206, such as requests for websites, selections of survey response options, input text strings, etc.

A client device 110 may include or be identified with a device identifier 216B. Device identifiers 216B may include any type and form of identification, including without limitation a MAC address, text and/or numerical data string, a username, a cryptographic public key, cookies, device serial numbers, user profile data, network addresses, or any other such identifier that may be used to distinguish the client device 110 from other client devices 110. In some implementations, device identifiers 216B may be globally unique. In some implementations, a device identifier 216B may be associated with one or more other device identifiers 216B (e.g., a device identifier for a mobile device, a device identifier for a home computer, etc.), to identify devices associated with a single user. In many implementations, to preserve privacy, the device identifier 216B may be cryptographically generated, encrypted, or otherwise obfuscated. In some implementations, client device 110 may include a session identifier (not illustrated) which may be similar to a device identifier 216B but generated more frequently, such as hourly, daily, upon activation of application 212, or any other such period. A session identifier may be generated by a client device 110 or received from a server, content provider, or other device. A session identifier may be used in place of a device identifier 216B to increase anonymity, or may be used in connection with device identifiers 216B to distinguish interactions of one session from those of another session. A session may include one or more requests for multimedia content (e.g., streaming content media, common media package) and each session may include a time and/or date record associated with each session. Similarly, a client device may be associated with or receive a registration identifier 222. Registration identifier 222 may comprise a text and/or numerical data string, a username, a cryptographic public key, cookies, or any other type and form of identifier for uniquely identifying the device. As discussed above, registration identifier 222 may be generated by an MDX server 120 and/or cloud messaging server upon registration of the device. The registration identifier 222 may be the same as, or different from, a device identifier or session identifier.

Client device 110 may execute a discovery agent 218B. A discovery agent 218B may comprise an application, server, service, daemon, routine, or other executable logic for receiving discovery triggers from an MDX server 120 and, in response to receipt of the trigger, initiating a discovery protocol on a local network. In some implementations, the discovery agent 218B may comprise logic for broadcasting a discovery request on the network to cause other devices to reply with and/or broadcast a device identifier of the device. Discovery agent 218B may also comprise logic for responding to a discovery request with a broadcast or transmitted device identifier 216B and/or registration identifier 222. In some implementations, discovery agent 218B may also comprise logic for initiating a communication or pairing session with another device, once discovered.

Client device 110 may execute a connection monitor 232. Connection monitor 232 may comprise an application, service, server, daemon, routine, or other executable logic for monitoring a connection status of a network interface to a LAN, such as a WiFi status, network interface card (NIC) status, operating system status, or other such status. Connection monitor 232 may comprise a hook to a communications API of the operating system and monitor a local IP address for changes and/or disconnects or refreshes. In one implementation, connection monitor 232 may monitor an external IP address of the network for changes. For example, connection monitor 232 may transmit a "what's my IP" request to an external service or server, causing the service or server to respond with a packet including the source IP address of the request (e.g. the external IP of a gateway or modem performing network address translation for the LAN) in a payload of the packet. Connection monitor 232 may store a previous IP address and compare the result to determine whether the network address has changed. Upon detecting a change or connecting to a new network, in some implementations, connection monitor 232 may transmit a connection notification 128 to an MDX server 120, as discussed above.

MDX server 120 may comprise one or more servers, including a cloud, cluster, or farm of servers. MDX server 120 may comprise one or more physical machines, and/or one or more virtual machines executed by one or more physical machines. For example, MDX server 120 may comprise a virtual machine executing in a distributed manner across a plurality of physical machines in a server cluster. MDX server 120 may thus comprise one or more processors 202, one or more memory devices 204, one or more I/O interfaces 206, and one or more network interfaces 208. Although shown together, in some implementations, parts of MDX server 120 may be distributed across a plurality of computing machines. For example, MDX server 120 may comprise a plurality of computing devices and a second plurality of storage devices.

MDX server 120 may execute a registrar 230. Registrar 230 may comprise an application, service, server, daemon, routine, or other executable logic for registering client devices 110. Registrar 230 may receive a device identifier 216B from a client device in a registration request, and may generate a registration identifier 222 for the client device 110. In some implementations, registrar 230 may receive the registration request and respond with a registration identifier via a cloud messaging service, which may be provided by the MDX server 120 or another computing device in communication with the MDX server. Accordingly, MDX server 120 may be used interchangeably to describe the MDX server, the cloud messaging service provider, or both together. As discussed above, registrar 230 may generate the registration identifier 222 in any suitable fashion, including generating a random number or string; executing a hash function on device identifier 216B (and, in some implementations, a seed such as a timestamp or random number or string, or a user identifier, session identifier, or other such information); or via other functions. Registration identifier 222 may thus comprise a number, alphanumeric string, cryptographic hash result, or other such data.

Registrar 230 may maintain a registration identifier database 236. Registration identifier database 236, sometimes referred to as a registrar database or registration ID file, may comprise a database, flat file, array, or any other type and form of data storage for storing registration identifiers 222 in association with corresponding device identifiers 216B of devices. For example, registration identifier database 236 may comprise an array of device identifiers 216B, each stored at indices equal to the corresponding registration identifier 222, or vice versa, allowing quick and efficient lookup.

MDX server 120 may execute a connection manager 232. Connection manager 232 may comprise an application, service, server, daemon, routine, or other executable logic for receiving connection notifications from a connection monitor 232 of a client device. As discussed above connection notifications may be sent periodically or on detection of connection to a new local network, and may comprise an external IP address of the local network and a registration identifier 222. In some implementations, the connection manager 232 may extract the registration identifier 222 and external IP address from the connection notification, such as from an application layer payload and internet layer header respectively, or from anywhere else within the packet (e.g. options fields of headers, payloads, etc.). Connection manager 232 may store the extracted registration identifier 222 in a notification key corresponding to the external IP address in a notification key database 238. Notification key database 238 may comprise any type and form of data storage, including a flat file, array, indexed set of parameters and values, or any other type of data. In one implementation, a notification key database 238 may comprise data strings comprising registration identifiers 222 at index positions corresponding to the IP addresses. Accordingly, the connection manager 232 may be able to look up IP addresses and store identifiers 222 quickly and efficiently. In one implementations, registration identifiers 222 may be stored in the notification key as concatenated data. For example, each registration identifier 222 may have a predetermined length (e.g. 16 bits, 32 bits, 64 bits, etc.) and the connection manager 232 may update a notification key by adding the registration identifier 222 received in a connection notification to any other identifier(s) 222 already stored in the notification key. Each identifier may be later extracted in turn by retrieving predetermined lengths of data from the key. In other implementations, identifiers 222 may be separated by delimiters.

In some implementations, connection manager 232 may generate notification keys, add registration identifiers 222 to notification keys, and remove registration identifiers 222 from keys, responsive to expiration of timers, new connection notification messages including the registration identifiers, or key flush or release commands. In some implementations, an entire key may be deleted or flushed, while in other implementations, individual registration identifiers may be removed from the key without affecting other registration identifiers stored in the key.

MDX server 120 may execute a discovery manager 234. Discovery manager 234 may comprise an application, service, server, daemon, routine, or other executable logic for receiving discovery requests from a discovery agent 218A of a media device 102 and transmitting discovery triggers to each associated client device 110. As discussed above, discovery requests may comprise an external IP address of the LAN to which the media device 102 is connected, such as in a source IP field of an Internet layer header. Discovery manager 234 may query a notification key database 238 for a notification key associated with the external IP address of the discovery request. If a key is found, then the discovery manager 234 may transmit a discovery trigger to each client device identified by a registration identifier in the notification key. In some implementations, the discovery manager 234 may direct a cloud messaging service to transmit triggers via push notifications to the client devices identified by the registration identifiers in the key; the cloud messaging service may access the registration identifier database 236 to identify the corresponding device identifiers 216B and transmit the notifications. Accordingly, in such implementations, the registration identifier database 236 and/or registrar 230 may be executed by a cloud messaging server in communication with the MDX server.

As discussed above, client devices 110 may initiate a discovery protocol and respond to the discovery trigger with an identification of devices (e.g. media devices 102) found on their local network. The discovery manager may compare the list of identified devices to a device identifier 216A included in the discovery request from the media device 102. If a match is found, then the discovery manager 234 may determine that a client device has discovered the media device. In some implementations, the discovery manager 234 may transmit a discovery status message to the media device, identifying the client devices that have discovered it, such as a message comprising one or more registration identifiers 222 and/or device identifiers 216B of client devices 110 that have discovered the media device 102. The media device may then open one or more sockets, perform pairing protocols, display prompts to a user for authentication, etc., as discussed above.

Figure 3:
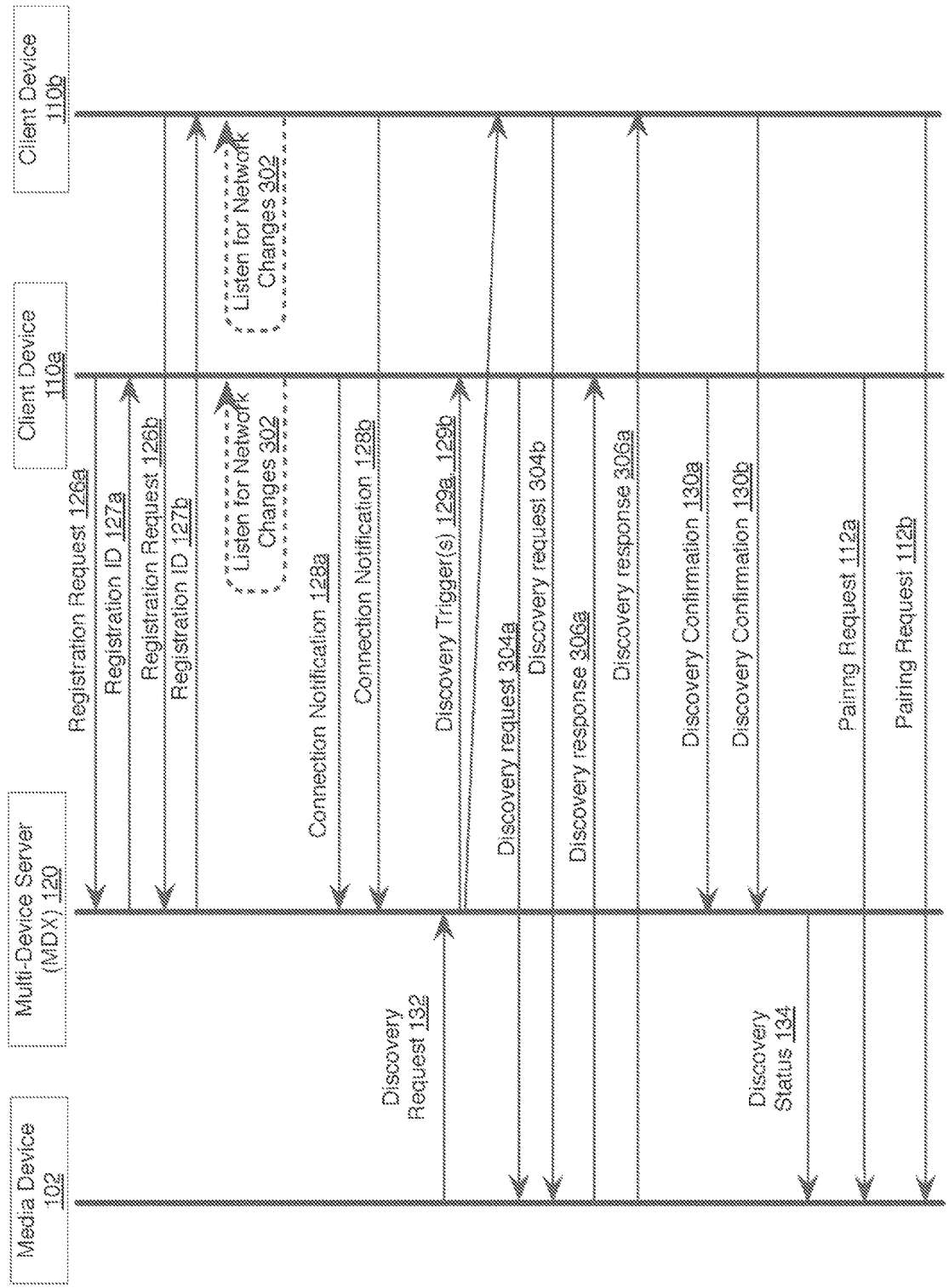
FIG. 3 is a signal flow diagram of the communication between a media device, an MDX server, and two client devices in one implementation of a process for server-based client device discovery.

FIG. 3 is a signal flow diagram of the communication between a media device 102, an MDX server 120, and two client devices 110a, 110b in one implementation of a process for server-based client device discovery. Although shown as a single server 120, in many implementations, functions of MDX server 120 may be split between an MDX server and a cloud messaging service.

At step 126a, a client device 110a may transmit a registration request to an MDX server 120 and/or a cloud messaging service. The registration request may comprise a device identifier of the client device. At step 127a, the MDX server and/or cloud messaging service may generate a registration identifier; add the device identifier and registration identifier to a registration identifier database; and respond to the client device with the registration identifier. Similarly, at another time, client device 110b may also transmit a registration request 126b and may receive a registration identifier 127b.

Each of client device 110a and 110b may monitor their local network connections for changes. Responsive to detecting a change, each device may transmit a connection notification 128a, 128b to the MDX server 120. The notification may comprise the external IP address of the local area network to which the client device is connected, and the registration identifier of the device. The MDX server may generate and/or add the registration identifier to a notification key associated with the external IP address of the network.

At some subsequent time, the MDX server 120 may receive a discovery request 132 from the media device 102 comprising the external IP address of the local area network and a device identifier of the media device 102. The MDX server 120 may retrieve the corresponding notification key and extract registration identifier(s) from the key. The MDX server 120 may transmit discovery triggers 129a, 129b to the corresponding client devices 110a, 110b. Transmitting the discovery triggers in some implementations may comprise directing a cloud messaging service to transmit push notifications to the devices corresponding to the registration identifiers extracted from the notification key, the push notifications triggering client devices 110a, 110b to initiate a discovery protocol.

Responsive to receiving the push notification or discovery trigger, each client device 110 may transmit or broadcast a discovery request 304a, 304b on the local network via any suitable device discovery protocol (e.g. DIAL, simple service discovery protocol (SSDP), Neighbor Discovery protocol, etc.). In response to receiving each request, the media device 102 may respond with a discovery response 306a, 306b in the corresponding protocol. The response 306 may comprise a device identifier of the media device 102.

In some implementations, each client device may receive discovery request(s) from other client devices on the network and may also respond with a discovery response 306 (not illustrated). Discovery responses 306 may be unicast to the requesting client, or may be broadcast on the local network. In implementations using broadcast, to prevent broadcast storms or excess bandwidth consumption, a timer may be used to prevent multiple broadcast responses. For example, responsive to receiving a first discovery request, a media device 102 may broadcast a discovery response on the local network. The media device 102 may then ignore any subsequent discovery requests for a predetermined period (e.g. 5 seconds, 10 seconds, etc.). In a similar implementation, the media device 102 may wait the predetermined period after receipt of a first discovery request for any additional requests, and then may broadcast a single response on the network to each request.

Responsive to receipt of a discovery response 306 from the media device 102, each client device 110 may transmit a discovery confirmation 130a, 130b to MDX server 120. The discovery confirmation may comprise the external IP address of the local area network (e.g. in an Internet layer header, or elsewhere within the packet), and a list of device identifiers of media device(s) discovered on the network. The discovery confirmation 130 may be transmitted via the LAN and WAN connection to the MDX server 120 directly, or may be transmitted via the cloud messaging service (e.g. as a response to the push notification comprising the discovery trigger).

Responsive to receiving a discovery confirmation 130 including the device identifier of the media device 102, the MDX server 120 may transmit a discovery status message 134 to the media device 102. The status message 134 may comprise registration identifiers and/or device identifiers of the client device(s) 110 that discovered the media device. Upon receipt of the discovery status message, the media device 102 may open sockets, begin handshaking protocols, or perform other pairing tasks 112a, 112b with client device (s) 110 via any suitable pairing or screencasting or content casting protocol.

Figure 4:
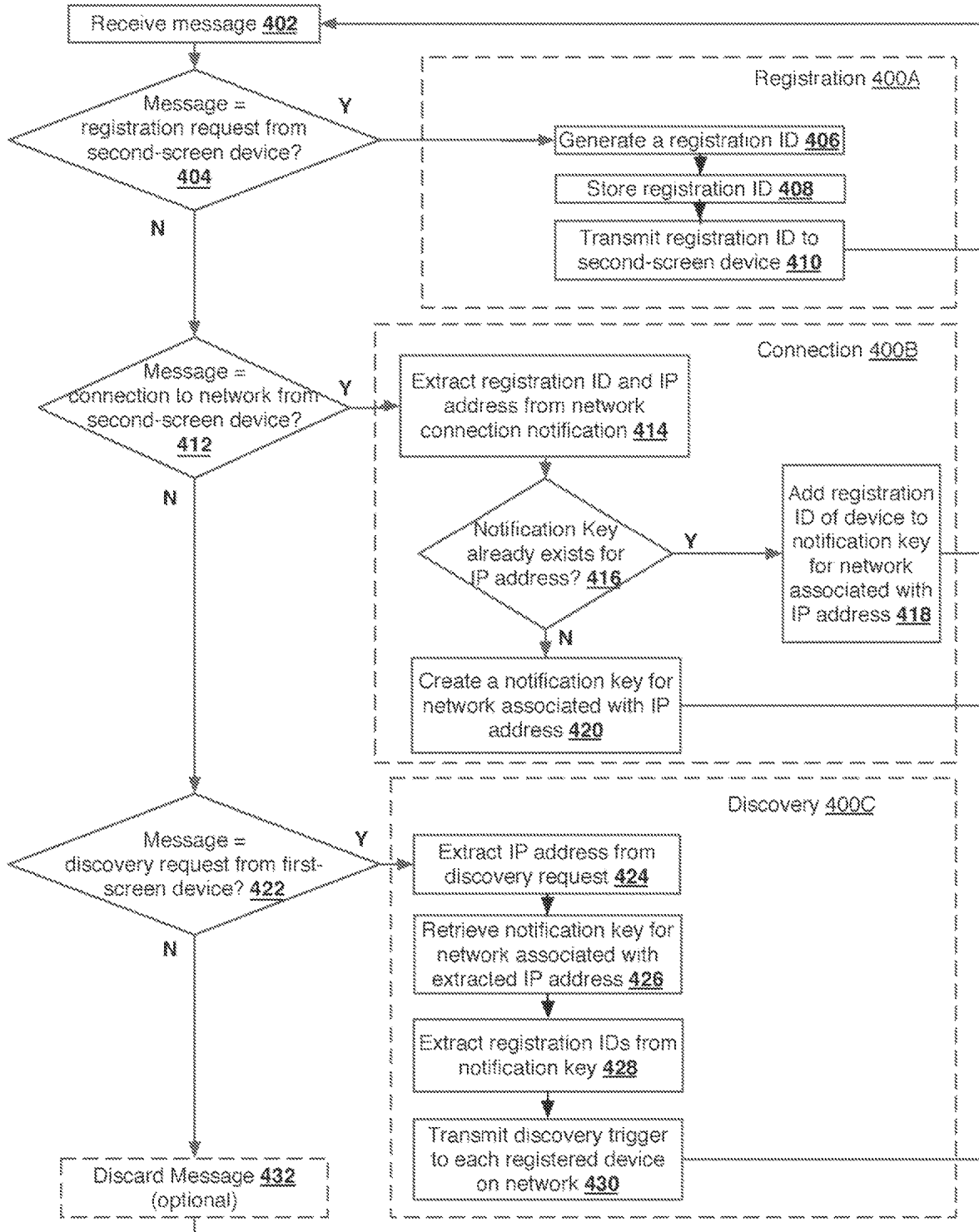
FIG. 4 is a flow chart of the steps taken by a multi-device server in an implementation of a process for server-based client device discovery.

FIG. 4 is a flow chart of the steps taken by a multi-device server in an implementation of a process for server-based client device discovery. As discussed above, the process is divided into a first registration phase 400A, a second connection phase 400B, and a third discovery phase 400C. Although discussed in order, in many implementations, the phases may be repeated or performed out of order: for example, a first device may register in phase 400A and send a connection notification in phase 400B; then a second device may register in phase 400A.

At step 402, an MDX server or cloud messaging server may receive a message. The message may be transmitted via any type and form of protocol, as discussed above. In some implementations, the message may comprise a registration request from a client device. If the server identifies the message as such as step 404, then in registration phase 400A, the server may generate a registration identifier at step 406, store the registration identifier in a registration identifier database at step 408, and transmit the registration identifier to the second screen device at step 410.

Figure 5:
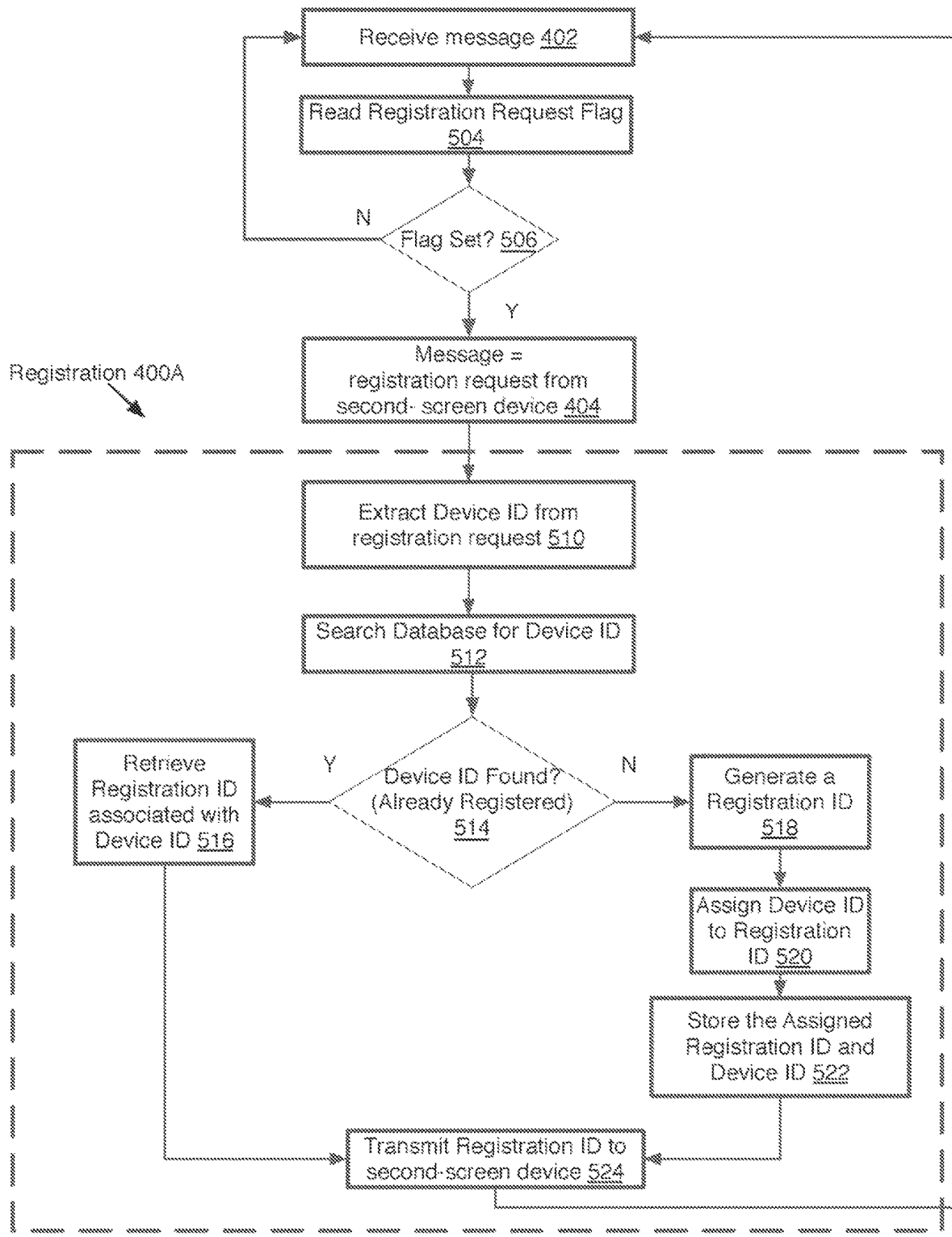
FIG. 5 is a flow chart of the steps taken by a multi-device server during the registration phase of an implementation of the process of FIG. 4 for server-based client device discovery.

Referring ahead to FIG. 5, illustrated is a flow chart of the steps taken by an MDX server during the registration phase 400A of an implementation of the process of FIG. 4 for server-based client device discovery. As discussed above and in more detail, at step 402, the MDX server or cloud messaging server may receive a message. The message may, in some implementations, include a registration request flag or other such identifier. For example, the message may comprise an application layer protocol message comprising a request to register the device identifier, and may include a command, string, or other such identifier to indicate the message is a registration request. At step 504 the server may read the flag or identifier to identify the message as a registration request. If such a flag or identifier is not set, then at step 506, the server may discard the message and return to step 402 or proceed with other message recognition steps of FIG. 4. However, if the flag is set, then the message may be identified as a registration request at step 404.

At step 510, the MDX server or cloud messaging server may extract a device identifier from the registration request. The device identifier may be stored in a payload of the message, in an options field of a header such as a transport layer header, or anywhere else within the packet. As discussed above, the device identifier may be of any type and form, and may have a predetermined length or a variable length.

At step 512, in some implementations, the MDX server or cloud messaging server may search a registration identifier database for the device identifier. At step 514, the MDX server or cloud messaging server may determine whether such a device identifier is found within the database. If so, then the device has been previously registered, and at step 516, the MDX server or cloud messaging server may retrieve the previously generated registration identifier associated with the device identifier in the database. At step 524, the MDX server or cloud messaging server may transmit the registration identifier to the client device, such as via a push notification or response to the registration request message.

Conversely, if the device identifier is not found, then at step 518, the MDX server or cloud messaging server may generate a new registration identifier. The registration identifier may be generated randomly, such as via a random number generator; may be generated with a hash function based on the device identifier (and, in some implementations, one or more additional data items as seeds, such as a timestamp or random number); or may be generated via incrementing from a previous registration identifier. At step 520, the MDX server or cloud messaging server may assign the device identifier to the registration identifier, and at step 522, the MDX server or cloud messaging server may store the registration identifier and device identifier in a registration identifier database. At step 524, the newly generated registration identifier may be transmitted to the client device, as discussed above.

Returning to FIG. 4 and continuing, in some implementations, the message may comprise a connection notification of a client device upon connection to a new local area network. If the server identifies the message as such at step 412, then in connection phase 400B at step 414, a connection manager of the MDX server may extract a registration identifier and IP address from the network connection notification. At step 416, the connection manager may determine if a notification key exists for the local network identified by the IP address. If so, then at step 418, the connection manager may add the registration identifier to the corresponding notification key. If not, at step 420, the connection manager may create a new notification key and add the registration identifier to the new notification key.

Figure 6:
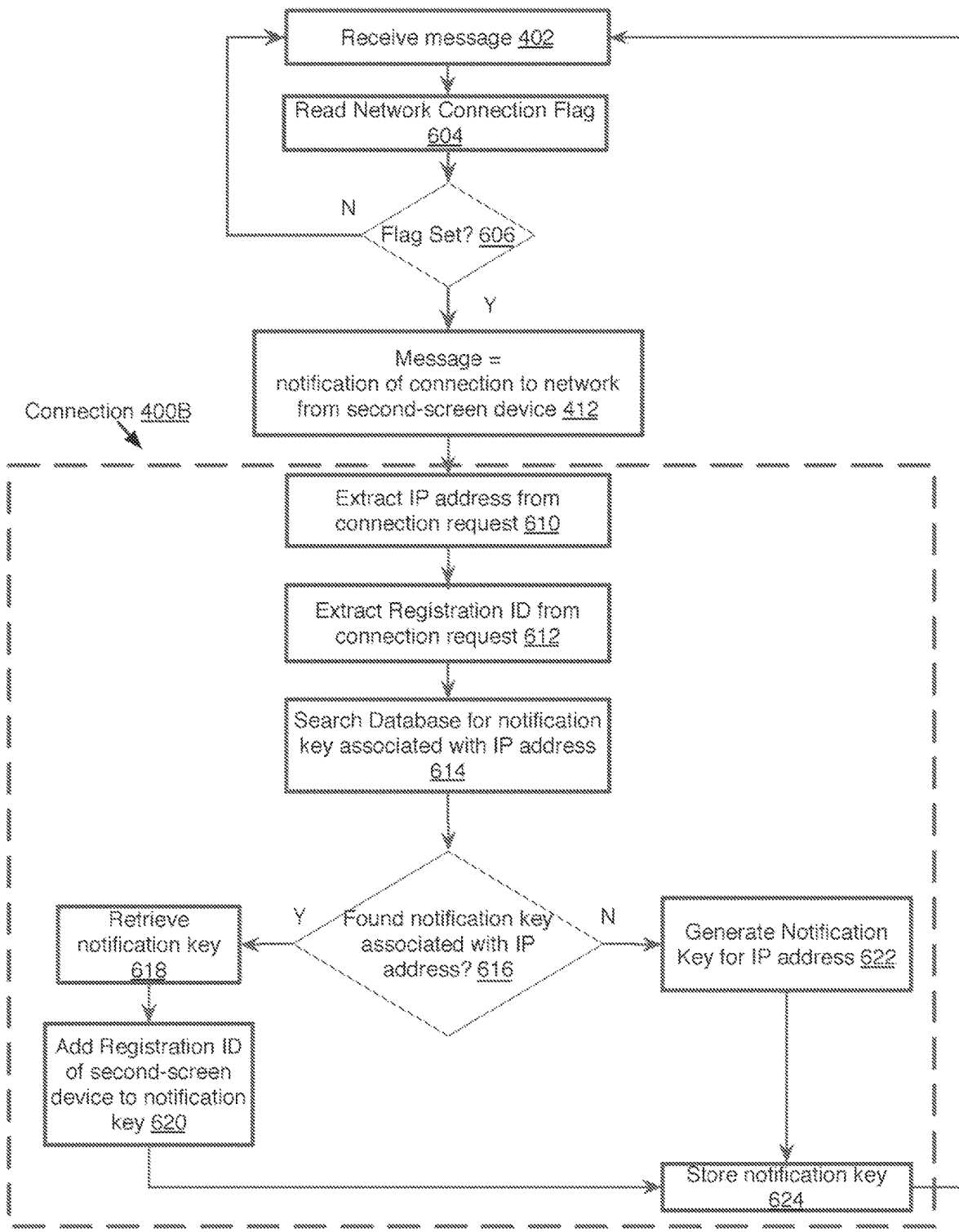
FIG. 6 is a flow chart of the steps taken by a multi-device server during the connection phase of an implementation of the process of FIG. 4 for server-based client device discovery.

Referring ahead to FIG. 6, illustrated is a flow chart of the steps taken by an MDX server during the connection phase 400B of an implementation of the process of FIG. 4 for server-based client device discovery. As discussed above in connection with FIG. 5, at step 402, the MDX server may receive a message. The message may, in some implementations, include a connection notification flag or other such identifier. For example, the message may comprise an application layer protocol message comprising a request to add the registration identifier of the device to a notification key, and may include a command, string, or other such identifier to indicate the message is a connection notification. At step 604 the server may read the flag or identifier to identify the message as a connection notification. If such a flag or identifier is not set, then at step 606, the server may discard the message and return to step 402 or proceed with other message recognition steps of FIG. 4. However, if the flag is set, then the message may be identified as a registration request at step 412.

At step 610, the MDX server or a connection manager of the MDX server may extract an external IP address of a local network to which the client device has connected from the connection notification request. In some implementations, the IP address may be in a payload of the request, while in other implementations, the IP address may be a source IP address in an Internet layer header of the packet (e.g. 1Pv4, IPv6, or other such protocol). At step 612, the connection manager may extract a registration identifier from the connection notification request. As discussed above, the registration identifier may be stored in a header of the packet, such as in an options field, or in a payload of the packet.

At step 614, in some implementations, the connection manager may search a notification key database for a notification key associated with the extracted external IP address; and at step 616, may determine whether a previously generated key exists in the database. If so, then at step 618 in some implementations, the connection manager may retrieve the notification key from the database; and/or at step 620, the connection manager may add the registration identifier of the client device to the notification key. As discussed above, adding the identifier to the key may comprise concatenating the registration identifier with existing identifiers; adding the registration identifier with a delimiter; adding an entry or string to a database or array; or otherwise associating the registration identifier with the notification key. At step 624, the connection manager may store the edited notification key in the notification key database.

If no notification key is found in the database at step 616, then at step 622, the connection manager may generate a new notification key for the external IP address, and may store the registration identifier with the key (such as via the methods above for adding the identifier to the key). At step 624, the connection manager may store the newly generated notification key in the notification key database.

Returning to FIG. 4 and continuing, in some implementations, the message may comprise a discovery request of a media device. If the server identifies the message as such at step 422, then in connection phase 400C, the server or a discovery manager of the server may extract an external IP address of the local area network from the request at step 424. At step 426, the discovery manager may retrieve a notification key associated with the extracted IP address, and at step 428, may extract one or more registration identifiers from the notification key. At step 430, the discovery manager may transmit a discovery trigger to each client device associated with an extracted registration identifier, or, in some implementations, may direct a cloud messaging service to transmit a push notification to each client device associated with an extracted registration identifier.

Figure 7:
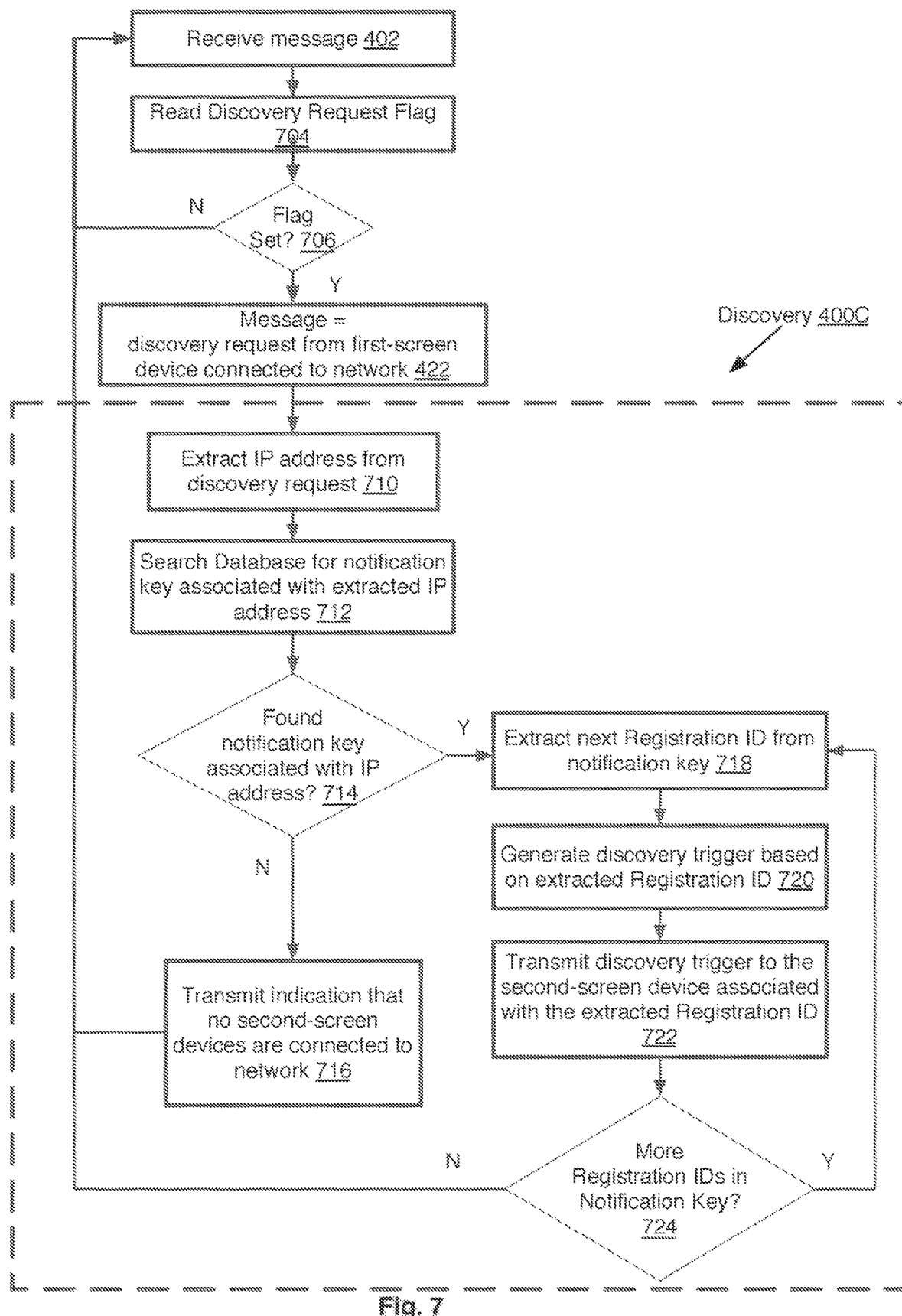
FIG. 7 is a flow chart of the steps taken by a multi-device server during the discovery phase of an implementation of the process of FIG. 4 for server-based client device discovery.

FIG. 7 is a flow chart of the steps taken by a multi-device server during the discovery phase of an implementation of the process of FIG. 4 for server-based client device discovery. As discussed above in connection with FIGS. 5 and 6, at step 402, the MDX server may receive a message. The message may, in some implementations, include a discovery request flag or other such identifier. For example, the message may comprise an application layer protocol message comprising a request to trigger discovery, and may include a command, string, or other such identifier to indicate the message is a discovery request. At step 704 the server may read the flag or identifier to identify the message as a discovery request. If such a flag or identifier is not set, then at step 706, the server may discard the message and return to step 402 or proceed with other message recognition steps of FIG. 4. However, if the flag is set, then the message may be identified as a discovery request at step 422.

At step 710, the MDX server or a discovery manager of the MDX server may extract an external IP address of a local network to which the media device is connected from the discovery request. In some implementations, the IP address may be in a payload of the request, while in other implementations, the IP address may be a source IP address in an Internet layer header of the packet (e.g. IPv4, IPv6, or other such protocol). In some implementations, the discovery manager may also extract a device identifier of the media device from the request packet, such as from a payload or options field of a header.

At step 712, the discovery manager may search the notification key database for a notification key associated with the extracted IP address, and may determine whether one is found at step 714. If not, then at step 716, the discovery manager may respond to the discovery request with a message indicating that no client devices are presently attached to the network.

If a notification key is found, then at step 718, in some implementations, the discovery manager may extract a first registration identifier from the notification key. In some implementations, the discovery manager may read from the key up to a delimiter or to a predetermined length, while in other implementations, the discovery manager may read a first string or entry associated with the key. At step 720, the discovery manager may generate a discovery trigger based on the extracted registration identifier and at step 722, may transmit the discovery trigger to the client device associated with the extracted registration identifier. As discussed above, in some implementations, the discovery manager may direct a cloud messaging service to transmit a push notification to the device associated with the extracted registration identifier to trigger a discovery protocol. The cloud messaging service may retrieve the device identifier corresponding to the registration identifier from a registration identifier database, and may transmit the push notification via the device identifier.

In some implementations, the discovery manager may determine at step 724 if additional registration identifiers are stored in the notification key. If so, steps 718-724 may be repeated iteratively. Determining if additional registration identifiers exist may comprise reading a next portion of the key after a delimiter or identifier, identifying a flag or end of key marker, querying a database for a next entry or string, or performing other such functions.

In some implementations, the discovery manager may retrieve the key and may provide all of the registration identifiers to a cloud messaging service, which may perform steps 718-724.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In many implementations, data collected about a user may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, user's preferences, or a user's current location) do so, or an opportunity to control whether or how to transmit measurement data to a content media server. In addition, certain data may be treated in one or more ways before it is stored or used by an audience measurement server, so that personally identifiable information is removed when generating parameters (e.g., demographic parameters).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). Client devices receiving content and providing relay pings, identifiers, or other data to an audience measurement service and/or panel provider may be smart television modules. The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

One implementation disclosed herein is a method for server-based client device discovery. The method includes receiving, by a multi-device experience (MDX) server, a registration request from a second-screen device to register with the MDX server, the request comprising a device identifier associated with the second-screen device. The method also includes generating, by the MDX server, a registration identifier associated with the second-screen device, responsive to receiving the registration request. The method further includes transmitting, by the MDX server, the registration identifier to the second-screen device. The method also includes subsequently receiving, by the MDX server from the second-screen device, a connection notification comprising the registration identifier of the second-screen device and an external internet protocol (IP) address of a first network, the connection notification transmitted responsive to the second-screen device connecting to the first network. The method includes adding, by the MDX server, the registration identifier of the second-screen device to a notification key associated with the external IP address of the first network. The method also includes subsequently receiving, by the MDX server from a first-screen device connected to the first network, a discovery request comprising the external IP address of the first network. The method further includes retrieving, by the MDX server, the notification key associated with the external IP address of the first network. The method also includes extracting, by the MDX server and from the retrieved notification key, the registration identifier of the second-screen device; and transmitting, by the MDX server to the second-screen device, a message comprising the registration identifier and a command to initiate a discovery protocol on the first network, in response to receipt of the discovery request from the first-screen device.

In some implementations, the method includes receiving, by the MDX server from the second-screen device, a confirmation that the second-screen device discovered the first-screen device, the confirmation comprising a device identifier of the first-screen device and the device identifier of the second-screen device. In other implementations, the method includes selecting, by the MDX server from a database, the notification key, responsive to the notification key being associated with an IP address matching the external IP address of the first network; adding, by the MDX server, the registration identifier of the second-screen device to the notification key; and storing, by the MDX server, the concatenated notification key in the key database. In a further implementation, the method includes adding the registration identifier of the second-screen device to the notification key by concatenating the registration identifier with a second registration identifier associated with a second second-screen device on the first network.

In some implementations, the method includes extracting, by the MDX server from the retrieved notification key, the registration identifier of a second second-screen device connected to the first network; and transmitting, by the MDX server to the second second-screen device, a command to initiate a discovery protocol on the first network, responsive to receipt of the discovery request from the first-screen device. In a further implementation, the method includes receiving, by the MDX server from the second-screen device, a confirmation that the second-screen device discovered the first-screen device, the confirmation comprising the device identifier of the first-screen device and the device identifier of the second-screen device; and receiving, by the MDX server from the second second-screen device, a confirmation that the second second-screen device discovered the first-screen device, the confirmation comprising the device identifier of the first-screen device and a device identifier of the second-screen device. In a still further implementation, the method includes transmitting, by the MDX server to the second-screen device, a list comprising a device description associated with the second-screen device and a device description associated with the second second-screen device, in response to receipt of the status request from the second-screen device.

In some implementations, the method includes receiving, by the MDX server from a second second-screen device, a connection notification comprising a registration identifier of the second second-screen device and an external internet protocol (IP) address of a second network, the connection notification transmitted responsive to the second second-screen device connecting to the second network. The method also includes adding, by the MDX server, the registration identifier of the second second-screen device to a notification key associated with the external IP address of the second network. In a further implementation, the method includes receiving, by the MDX server from a second first-screen device connected to the second network, a discovery request comprising the external IP address of the second network; retrieving, by the MDX server, the notification key associated with the external IP address of the second network; extracting, by the MDX server and from the retrieved notification key associated with the external IP address of the second network, the registration identifier of the second second-screen device; and transmitting, by the MDX server to the second second-screen device, a message comprising the registration identifier and a command to initiate a discovery protocol on the second network, in response to receipt of the discovery request from the second first-screen device.

In another aspect, the present disclosure is directed to a system for server-based client device discovery. The system includes a multi-device experience (MDX) server in communication with a network, the network in communication with a second-screen device, the MDX server comprising circuitry configured to: receive a registration request from the second-screen device to register with the MDX server, the request comprising a device identifier associated with the second-screen device; generate a registration identifier associated with the second-screen device, responsive to receiving the registration request; and transmit the registration identifier to the second-screen device. The circuitry is also configured to subsequently receive, from the second-screen device, a connection notification comprising the registration identifier of the second-screen device and an external internet protocol (IP) address of a first network, the connection notification transmitted responsive to the second-screen device connecting to the first network; and add the registration identifier of the second-screen device to a notification key associated with the external IP address of the first network. The circuitry is also configured to subsequently receive, from a first-screen device connected to the first network, a discovery request comprising the external IP address of the first network; retrieve the notification key associated with the external IP address of the first network; extract, from the retrieved notification key, the registration identifier of the second-screen device; and transmit a message comprising the registration identifier and a command to initiate a discovery protocol on the first network, in response to receipt of the discovery request from the first-screen device.

In some implementations, the circuitry of the MDX server is further configured to receive, from the second-screen device, a confirmation that the second-screen device discovered the first-screen device, the confirmation comprising a device identifier of the first-screen device and the device identifier of the second-screen device. In other implementations, the circuitry of the MDX server is further configured to add the registration identifier of the second-screen device to the notification key by: selecting, from a database, the notification key, responsive to the notification key being associated with an IP address matching the IP address of the first network; adding, the registration identifier of the second-screen device to the notification key; and storing, the concatenated notification key in the key database. In a further implementation, the circuitry of the MDX server is further configured to add the registration identifier of the second-screen device to the notification key by concatenating the registration identifier with a second registration identifier associated with a second second-screen device on the first network.

In some implementations, the circuitry of the MDX server is further configured to: extract, from the retrieved notification key, the registration identifier of a second second-screen device connected to the first network; and transmit, to a second second-screen device, a command to initiate a discovery protocol on the first network, responsive to receipt of the discovery request from the first-screen device. In a further implementation, the circuitry of the MDX server is further configured to: receive, from the second-screen device, a confirmation that the second-screen device discovered the first-screen device, the confirmation comprising the device identifier of the first-screen device and the device identifier of the second-screen device; and receive, from the second second-screen device, a confirmation that the second second-screen device discovered the first-screen device, the confirmation comprising the device identifier of the first-screen device and a device identifier of the second-screen device. In a still further implementation, the circuitry of the MDX server is further configured to transmit, to the second-screen device, a list comprising a device description associated with the second-screen device and a device description associated with the second second-screen device, in response to receipt of the status request from the second-screen device.

In some implementations, the circuitry of the MDX server is further configured to: receive, from a second second-screen device, a connection notification comprising a registration identifier of the second second-screen device and an external internet protocol (IP) address of a second network, the connection notification transmitted responsive to the second second-screen device connecting to the second network; add the registration identifier of the second second-screen device to a notification key associated with the external IP address of the second network. The circuitry is also configured to receive, from a second first-screen device connected to the second network, a discovery request comprising the external IP address of the second network; retrieve the notification key associated with the external IP address of the second network; extract, from the retrieved notification key associated with the external IP address of the second network, the registration identifier of the second second-screen device; and transmit, to the second second-screen device, a message comprising the registration identifier and a command to initiate a discovery protocol on the second network, in response to receipt of the discovery request from the second first-screen device.

In still another aspect, the present disclosure is directed to a method for server-based client device discovery. The method includes transmitting, by a first-screen device to a multi-device experience (MDX) server, a registration request to register the first-screen device with the MDX server, the request comprising a device identifier associated with the first-screen device. The method includes receiving, by the first screen-device, a registration identifier associated with the first-screen device; and transmitting, by the first-screen device and to the MDX server, a command to initiate a discovery protocol of a second-screen devices on a first network. The method also includes receiving, by the first-screen device, a confirmation that the second-screen device discovered the first-screen device.

In a further implementation, transmission of the command further initiates a discovery protocol of a second second-screen device on the first network. In another further implementation, the method includes receiving, by the first-screen device from the MDX server, a confirmation that the second-screen device discovered the first-screen device, the confirmation comprising the device identifier of the first-screen device and the device identifier of the second-screen device; and receiving, by the MDX server from the second second-screen device, a confirmation that the second second-screen device discovered the first-screen device, the confirmation comprising the device identifier of the first-screen device and a device identifier of the second-screen device.

These implementations are mentioned not to limit or define the scope of the disclosure, but to provide an example of an implementation of the disclosure to aid in understanding thereof. Particular implementations may be developed to realize one or more of the following advantages.

What is claimed is:
1. A method for registering a media device, comprising:
receiving a registration request to register a client device with a server, the registration request comprising a first device identifier associated with the client device;
responding to the client device with a registration identifier to register the client device with the server;
receiving a registration request to register the media device with the server to allow the client device that is previously registered with the server to identify the media device, the registration request comprising a second device identifier associated with the media device; and
receiving the first device identifier from the client device that is previously registered with the server and an indication of whether the client device has identified the media device, wherein the client device is associated with a registration identifier maintained by the server.

2. The method of claim 1, wherein the second device identifier associated with the media device is a text or numerical data string.

3. The method of claim 1, wherein receiving the indication of whether the client device has identified the media device comprises:
   receiving a text or numerical data string from the client device; and
   determining whether the data string received from the client device matches the second device identifier associated with the media device.

4. The method of claim 3, further comprising:
   responsive to determining that the data string received from the client device matches the second device identifier associated with the media device, transmitting a discovery status message to the media device.

5. The method of claim 4, wherein the discovery status message comprises a second registration identifier associated with the media device.

6. The method of claim 1, wherein the second device identifier associated with the media device is maintained by the server in a database.

7. The method of claim 1, wherein the registration identifier for the client device is included in a notification key maintained by the server in a key database.

8. The method of claim 1, further comprising:
   responsive to receiving an indication of whether the client device has identified the media device, causing a prompt to be displayed on the media device or the client device for user confirmation.

9. A system for registering a media device, the system comprising:
   a memory; and
   a processor, coupled to the memory, to perform operations comprising:
   receiving a registration request to register a client device with a server, the registration request comprising a first device identifier associated with the client device;
   responding to the client device with a registration identifier to register the client device with the server;
   receiving a registration request to register the media device with the server to allow the client device that is previously registered with the server to identify the media device, the registration request comprising a second device identifier associated with the media device; and
   receiving the first device identifier from the client device that is previously registered with the server and an indication of whether the client device has identified the media device, wherein the client device is associated with a registration identifier maintained by the server.

10. The system of claim 9, wherein the second device identifier associated with the media device is a text or numerical data string.

11. The system of claim 9, wherein receiving the indication of whether the client device has identified the media device comprises:
    receiving a text or numerical data string from the client device; and
    determining whether the data string received from the client device matches the second device identifier associated with the media device.

12. The system of claim 11, the operations further comprising:
    responsive to determining that the data string received from the client device matches the second device identifier associated with the media device, transmitting a discovery status message to the media device.

13. The system of claim 12, wherein the discovery status message comprises a second registration identifier associated with the media device.

14. The system of claim 9, wherein the second device identifier associated with the media device is maintained by the server in a database.

15. The system of claim 9, wherein the registration identifier for the client device is included in a notification key maintained by the server in a key database.

16. The system of claim 9, the operations further comprising:
    responsive to receiving an indication of whether the client device has identified the media device, causing a prompt to be displayed on the media device or the client device for user confirmation.

17. A non-transitory computer readable medium comprising instructions, which when executed by a processor, cause the processor to perform operations comprising:
    receiving a registration request to register a client device with a server, the registration request comprising a first device identifier associated with the client device;
    responding to the client device with a registration identifier to register the client device with the server;
    receiving a registration request to register a media device with the server to allow the client device that is previously registered with the server to identify the media device, the registration request comprising a second device identifier associated with the media device; and
    receiving the first device identifier from the client device that is previously registered with the server and an indication of whether the client device has identified the media device, wherein the client device is associated with a registration identifier maintained by the server.

18. The non-transitory computer readable medium of claim 17, wherein the second device identifier associated with the media device is a text or numerical data string.

19. The non-transitory computer readable medium of claim 17, wherein receiving the indication of whether the client device has identified the media device comprises:
    receiving a text or numerical data string from the client device; and
    determining whether the data string received from the client device matches the second device identifier associated with the media device.

20. The non-transitory computer readable medium of claim 19, the operations further comprising:
    responsive to determining that the data string received from the client device matches the second device identifier associated with the media device, transmitting a discovery status message to the media device.

21. The non-transitory computer readable medium of claim 20, wherein the discovery status message comprises a second registration identifier associated with the media device.

22. The non-transitory computer readable medium of claim 17, wherein the registration identifier for the client device is included in a notification key maintained by the server in a key database.

23. The non-transitory computer readable medium of claim 17, the operations further comprising:
    responsive to receiving an indication of whether the client device has identified the media device, causing a prompt to be displayed on the media device or the client device for user confirmation.

\* \* \* \* \*